United States Patent

[11] 3,572,774

| [72] | Inventor | Clarence L. Sipler<br>Sipler Plastics, Inc. Central Bucks Airport<br>Old Easton Road, Doylestown, Pa. 18901 |
|---|---|---|
| [21] | Appl. No. | 699,897 |
| [22] | Filed | Jan. 23, 1968 |
| [45] | Patented | Mar. 30, 1971 |

[54] GASKET SEAL
3 Claims, 4 Drawing Figs.

[52] U.S. Cl. .................................................. 285/253,
277/101, 285/420
[51] Int. Cl. .................................................. F16l 33/04
[50] Field of Search .......................................... 277/101,
235; 285/365—367, 373, 374, 420, 15, 165, 177,
253

[56] References Cited
UNITED STATES PATENTS

| 3,061,665 | 10/1962 | Rugg et al. .................... | 285/177X |
| 3,298,698 | 1/1967 | Condon ......................... | 277/101 |
| 3,402,946 | 9/1968 | Dedian ......................... | 285/373X |

FOREIGN PATENTS

| 374,493 | 6/1932 | Great Britain ................ | 277/101 |

Primary Examiner—Laverne D. Geiger
Assistant Examiner—Robert I. Smith
Attorney—Zachary T. Wobensmith, II ABSTRACT: A gasket seal for use in the sealing of conduits with telescoped ends, the conduits being subjected to high vacuum flow therethrough, which seal consists of a flexible plastic band around the outside conduit with a lip extending over and beyond the outside conduit which lip engages the inner conduit and has an outer clamp extending to a rim on the lip and engaged with the lip and in overlapped relation to the end of the outer conduit to squeeze the band into engagement with the outside conduit and the lip into engagement with the inner conduit, and thereby provide an airtight seal.

PATENTED MAR 30 1971  3,572,774

INVENTOR
CLARENCE L. SIPLER

BY
Z.T. Wobensmith
ATTORNEY

GASKET SEAL

BACKGROUND OF THE INVENTION

1. Field of the Invention

This invention relates to a clamped gasket seal for use in sealing a joint between the telescoped ends of conduits which are subjected to high vacuum flow therethrough.

2. Description of the Prior Art

The use of tubular conduits such as those illustrated in my prior U.S. Pat. No. 2,990,855 has provided an airtight passageway between the air cleaner and the carburetor on automotive engines in a tortuous path. These conduits are used on large automotive engines for trucks and other vehicles at locations where considerable quantities of dust, dirt and other abrasive materials are present. The conduits have a considerable vacuum flow therethrough, and a leak, even a small one, will result in a large quantity of dirt being ingested which can quickly destroy the engine.

The conduits for short connections are often of metal, the outside one being slotted at the end to permit of expansion for installation. The slots are often a source of leakage which the previous seals were not able to prevent.

In addition some of the conduits are located in cramped spaces where it is almost impossible to install the previously available gasket seals and in some instances due to the high vacuum the seals are drawn in through the slots or between the connection whereby leakage occurs.

The gasket seal of the present invention provides an airtight seal, is easy to install and remove, and does not extrude into the conduits.

SUMMARY OF THE INVENTION

In accordance with the present invention a gasket is provided for the telescoped ends of conduits which is composed of a circumferential band, having an outer lip with a terminal rim, a serrated inner surface, an outer clamp retaining portion, and an interior shoulder for engagement with the end of an outer conduit and a clamp in overlapped relation to the conduits at said interior shoulder and inwardly of the ends of the band whereby the gasket is clamped to sealing position and provides an airtight vacuum seal.

The principal object of the present invention is to provide a gasket seal that provides an airtight vacuum seal at the joint between two conduits.

A further object of the present invention is to provide a gasket seal that may be easily removed and replaced.

A further object of the present invention is to provide a gasket seal that does not extrude into the conduit.

A further object of the present invention is to provide a gasket seal that does not slip off the conduit and which retains a clamp thereon.

A further object of the present invention is to provide a gasket seal that can be used with metal or plastic conduits.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Figure 1:
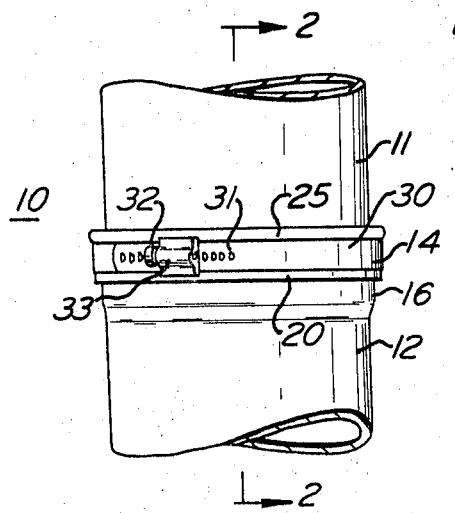
FIG. 1 is a view in elevation showing the gasket seal of the present invention in use.
Figure 2:
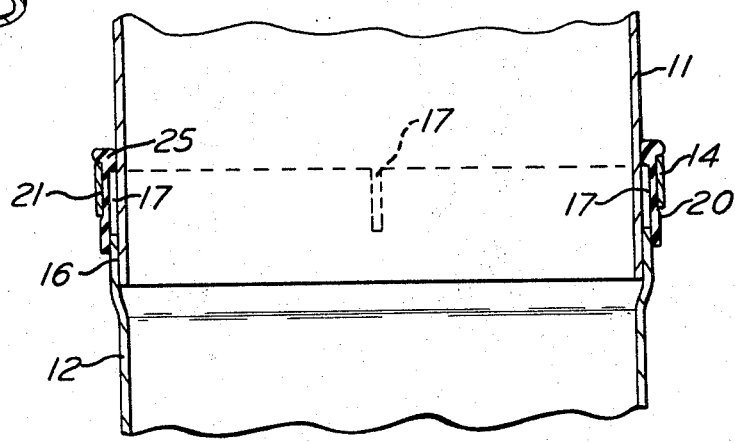
FIG. 2 is a longitudinal sectional view, enlarged, taken approximately on the line 2-2 of FIG. 1.

Referring now more particularly to the drawings, the gasket seal 10 in accordance with the invention is shown in place in FIGS. 1 and 2. The seal 10 of FIGS. 1 and 2 is shown sealing the telescoping ends of a pair of metal conduits 11 and 12, with a band clamp 14 of well-known type in gripping engagement therewith.

The conduit 11 is of circular cross section and has an end telescoped within an expanded end portion 16 of the conduit 12. The expanded end portion 16 has its internal diameter just large enough to permit the conduit 11 to slip therein and may be provided with a plurality of slots 17 to permit the portion 16 to be compressed to retain conduit 11 therein.

The seal 10 comprises an elastomeric circumferential band 20 preferably of rubber, natural or synthetic, or of a flexible synthetic plastic which is chemically inert or resistant to hydrocarbons. The band 20 has an exteriorly circumferentially grooved central portion 21 providing an exterior circumferential face which is depressed slightly on the outside only of the seal, the seal on the inside face 22 being flat.

Figure 3:
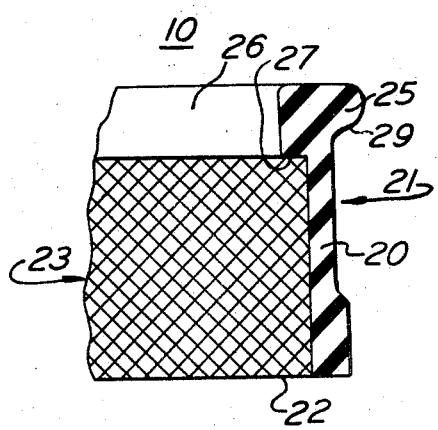
FIG. 3 is a fragmentary sectional view, further enlarged, illustrating a portion of the gasket seal of FIG. 2.

As shown more clearly in FIG. 3 the seal 10 may be provided with serrations 23 on the inside face 22 to obtain a gripping action on the exterior surface of the outer conduit 12.

The seal 10 has a lip 25 attached to the band 20 which lip is provided with an inner rim 26 which terminates at a shoulder 27 adjacent to the serrations 23 and extends inwardly with respect to the face 22 a distance at least as great as but preferably more than the thickness of the outer conduit 12.

The lip 25 has an outer rim 29 offset outwardly beyond the shoulder 27 which extends above the surface of band 20 and is cut back to provide an extension of the grooved portion 21 so that the clamp 14 may be retained on the band 20 and with the clamp 14 overlapping the shoulder 27.

The clamp 14 has an outer band 30 with slots 31 and screw 32 held in block 33 fastened to band 30 free to turn in the block 33 and normally engaged in slots 31.

Figure 4:
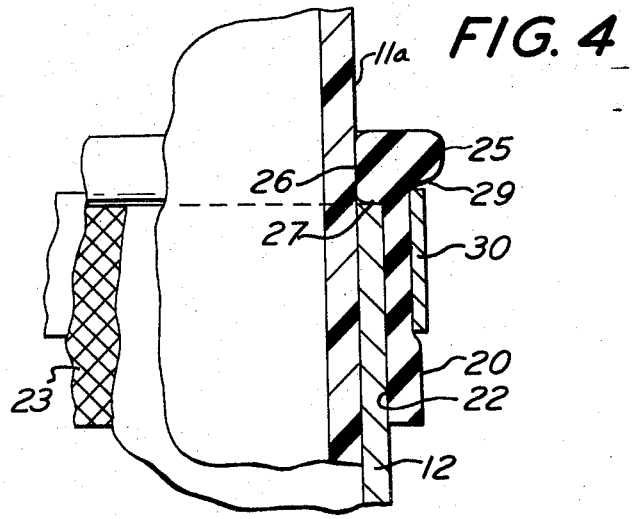
FIG. 4 is a fragmentary sectional view illustrating the gasket seal of FIG. 3 in place on two conduits.

As shown in FIG. 4 the inner conduit 11a may be composed of synthetic plastic material, and for this purpose may be of knitted textile fabric impregnated with a thermosetting resin as described more fully in my U.S. Pat. No. 2,990,855.

The mode of use will now be pointed out.

The conduits 11 and 12 or 11a and 12 are assumed to be in separated position. The seal 10 has the band 20 thereof expanded and slid over the expanded portion 16 of conduit 12 until the shoulder 27 abuts the end of the conduit 12. In this position the serrations 23 are in gripping engagement with the outer conduit 12 and effectively cover the slots 17. The conduit 11 or 11a as desired is inserted into the conduit 12. The rim 26 of lip 25 contacts the conduit 11 or 11a.

The clamp 14 is placed over the seal 10 in the depressed portion 21 and the screw 32 is tightened so that the band 30 is tightened. This forces the band 20 into fluid-tight and leak-proof circumferential engagement with the outer face of the conduit 12. The rim 26 is simultaneously forced inwardly by tightening of the band 30 into fluid-tight and leak-proof engagement with the outer face of the conduit 11 or 11a as guided by the shoulder 27.

Should removal be desired the screw 32 is loosened, clamp 14 removed and the seal 10 may be slid off portion 16 for replacement as described above.

It will thus be seen that structure has been provided with which the objects of the invention are attained.

I claim:

1. In combination:
   a pair of conduits having telescoped ends in engagement and in which the outer conduit has an exterior circumferential surface with a terminal shoulder and the inner conduit has an exterior circumferential surface;
   a flexible endless elastomeric band having side margins;

an interior shoulder between said side margins for engagement with the terminal shoulder;

a lip extending along the inner conduit, and having an inwardly extending rim bounded by one of the side margins and said interior shoulder and having an interior surface engaging the circumferential surface of the inner conduit;

said lip having an exteriorly disposed terminal rim portion spaced along the inner conduit in spaced relation beyond said shoulder;

said band having an interior face extending from said interior shoulder for engagement with the circumferential surface of the outer conduit; and a circumferentially contractable clamping member having side margins and being circumferentially disposed on said band and positioned with one of said side margins of the clamping member in contact with said terminal rim portion, said clamping member being disposed inwardly of the side margins of the band in overlapped relation to said band at said shoulder and simultaneously clamping said band in engagement with said circumferential surfaces of said conduits on opposite sides of said interior shoulder.

2. The combination defined in claim 1 in which said band has an external positioning groove for said clamping member bounded by said terminal rim.

3. The combination defined in claim 1 in which said band has a roughened inner surface to aid in gripping the exterior circumferential surface of one of said conduits.